United States Patent
Herman et al.

(10) Patent No.: US 11,673,533 B2
(45) Date of Patent: Jun. 13, 2023

(54) VEHICLE SENSOR ENHANCEMENTS

(71) Applicant: Ford Global Technologies, LLC, Dearborn, MI (US)

(72) Inventors: David Michael Herman, Oak Park, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1017 days.

(21) Appl. No.: 16/445,284

(22) Filed: Jun. 19, 2019

(65) Prior Publication Data
US 2020/0398797 A1    Dec. 24, 2020

(51) Int. Cl.
*H04N 5/217*    (2011.01)
*B60S 1/56*    (2006.01)
(Continued)

(52) U.S. Cl.
CPC .................. *B60S 1/56* (2013.01); *B08B 3/02* (2013.01); *B60S 1/481* (2013.01); *G01S 17/89* (2013.01);
(Continued)

(58) Field of Classification Search
CPC .......... B60S 1/56; B60S 1/481; G01S 17/894; G01S 17/89; B08B 3/02; G02B 27/0006;
(Continued)

(56) References Cited

U.S. PATENT DOCUMENTS 9,325,920 B2    4/2016    Van Nieuwenhove et al.
10,229,502 B2 *   3/2019    Adam .................. G01S 7/4808
(Continued)

FOREIGN PATENT DOCUMENTS

| CN | 108528431 | * | 3/2017 |
| CN | 111126114 | * | 11/2018 |

(Continued)

OTHER PUBLICATIONS

"Biharmonic equation", Wikipedia, https://en.wikipedia.org/wiki/Biharmonic_equation.
(Continued)

*Primary Examiner* — Zaihan Jiang
(74) *Attorney, Agent, or Firm* — Frank A. MacKenzie; Bejin Bieneman PLC (57) ABSTRACT

A computer includes a processor and a memory, the memory storing instructions executable by the processor to collect first sensor data from a time-of-flight sensor, collect second sensor data from one or more sensors, generate a virtual map of at least one of a light reflectivity or a depth from the time-of-flight sensor from the collected first sensor data and the collected second sensor data, determine a difference between the light reflectivity or the depth of each pixel of the first sensor data from the light reflectivity or the depth of each corresponding pixel of the virtual map, determine an occlusion of the time-of-flight sensor as a number of pixels having respective differences of the light reflectivity or the depth exceeding an occlusion threshold, and actuate a component to clean the time-of-flight sensor when the occlusion exceeds an occlusion threshold.

16 Claims, 5 Drawing Sheets

(51) Int. Cl.
*B60S 1/48* (2006.01)
*B08B 3/02* (2006.01)
*G02B 27/00* (2006.01)
*G01S 17/894* (2020.01)
*G06T 7/00* (2017.01)
*G06T 15/00* (2011.01)
*G01S 17/89* (2020.01)
*H04N 23/81* (2023.01)

(52) U.S. Cl.
CPC ........ *G01S 17/894* (2020.01); *G02B 27/0006* (2013.01); *G06T 7/00* (2013.01); *G06T 7/0002* (2013.01); *G06T 15/00* (2013.01); *H04N 23/811* (2023.01)

(58) Field of Classification Search
CPC ......... G06T 7/00; G06T 7/0002; G06T 15/00; H04N 5/2171
See application file for complete search history.

(56) References Cited

U.S. PATENT DOCUMENTS

| | | | |
|---|---|---|---|
| 10,241,198 B2 | 3/2019 | LaChapelle et al. | |
| 2009/0128833 A1* | 5/2009 | Yahav | H04N 13/207 356/623 |
| 2011/0228251 A1* | 9/2011 | Yee | G01S 17/10 356/5.01 |
| 2014/0368613 A1* | 12/2014 | Krupka | G01S 7/497 348/46 |
| 2016/0209729 A1* | 7/2016 | Hudman | G01S 17/46 |
| 2018/0130176 A1 | 5/2018 | Castorena Martinez | |
| 2018/0299534 A1 | 10/2018 | LaChapelle et al. | |
| 2018/0370496 A1* | 12/2018 | Sykula | B60S 1/56 |
| 2019/0018137 A1* | 1/2019 | Akkaya | G02B 27/0905 |
| 2019/0213309 A1* | 7/2019 | Morestin | G06T 7/521 |
| 2019/0213421 A1* | 7/2019 | Adato | G06Q 20/203 |
| 2020/0142069 A1* | 5/2020 | Onal | G06T 7/521 |

FOREIGN PATENT DOCUMENTS

| | | | |
|---|---|---|---|
| DE | 102016003021 | * | 3/2016 |
| WO | 2019064062 A1 | | 4/2019 |

OTHER PUBLICATIONS

Chui et al., "MRA contextual-recovery extension of smooth functions on manifolds", Appl. Comput. Harmon. Anal. 28 (2010) 104-113, http://www.elsevier.com/locate/acha.

Damelin et al., "On Surface Completion and Image Inpainting by Biharmonic Functions: Numerical Aspects", arXiv:1707.06567v3, Jun. 16, 2018.

"Inpainting" Wikipedia, https://en.wikipedia.org/wiki/Inpainting.

* cited by examiner

VEHICLE SENSOR ENHANCEMENTS

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors, e.g., sensor lens covers, may become dirty during operation of the vehicle. During vehicle operation, sensor data and/or environmental conditions around a vehicle can change, and such changes can affect sensor operation.

DETAILED DESCRIPTION

A computer includes a processor and a memory, the memory storing instructions executable by the processor to collect first sensor data from a time-of-flight sensor, collect second sensor data from one or more sensors, generate a virtual map of at least one of a light reflectivity or a depth from the time-of-flight sensor from the collected first sensor data and the collected second sensor data, determine a difference between the light reflectivity or the depth of each pixel of the first sensor data from the light reflectivity or the depth of each corresponding pixel of the virtual map, determine an occlusion of the time-of-flight sensor as a number of pixels having respective differences of the light reflectivity or the depth exceeding an occlusion threshold; and actuate a component to clean the time-of-flight sensor when the occlusion exceeds an occlusion threshold.

The instructions can further include instructions to generate a second virtual map of the other of the light reflectivity and the depth and to determine the occlusion as the number of pixels having respective differences between the light reflectivity and the depth of the pixel of the first sensor data and the light reflectivity and the depth of the corresponding pixel of the virtual maps exceeding respective light reflectivity and depth thresholds.

The instructions can further include instructions to actuate a fluid sprayer to spray cleaning fluid onto the time-of-flight sensor when the occlusion exceeds the occlusion threshold.

The instructions can further include instructions to identify a type of obstruction of the time-of-flight sensor based on the occlusion.

The type of obstruction can be one of light debris, heavy debris, clean water, debris in water, or debris on a light source.

The instructions can further include instructions to actuate a light source to emit a plurality of light pulses and to collect the first sensor data and the second sensor data during emission of the light pulses.

The instructions can further include instructions to determine the depth for each pixel of the first sensor data and the depth for each pixel of the second sensor data based on a time delay of receipt of illumination for each pixel after emission of the light pulses.

The instructions can further include instructions to determine the light reflectivity for each pixel of the first sensor data and the light reflectivity for each pixel of the second sensor data based on a respective illumination of each pixel after emission of the light pulses.

The instructions can further include instructions to mask a plurality of pixels of the virtual map, each masked pixel being a pixel of the first sensor data having a respective light reflectivity or depth exceeding a light reflectivity threshold or a depth threshold and the corresponding pixel of the second sensor data having a respective light reflectivity or depth below a second light reflectivity threshold or a second depth threshold.

The instructions can further include instructions to determine the occlusion of the masked pixels and to actuate the component when the occlusion exceeds the occlusion threshold.

The instructions can further include instructions to identify the masked pixels as pixels of the second sensor data for which light reflectivity or depth data were not collected.

The instructions can further include instructions to determine an ambient illumination and to determine the light reflectivity for each pixel of the first sensor data and each pixel of the second sensor data based on a difference between the ambient illumination and an amplitude of a light pulse received by each pixel.

A method includes collecting first sensor data from a time-of-flight sensor, collecting second sensor data from one or more sensors, generating a virtual map of at least one of a light reflectivity or a depth from the time-of-flight sensor from the collected first sensor data and the collected second sensor data, determining a difference between the light reflectivity or the depth of each pixel of the first sensor data from the light reflectivity or the depth of each corresponding pixel of the virtual map, determining an occlusion of the time-of-flight sensor as a number of pixels having respective differences of the light reflectivity or the depth exceeding an occlusion threshold, and actuating a component to clean the time-of-flight sensor when the occlusion exceeds an occlusion threshold.

The method can further include generating a second virtual map of the other of the light reflectivity and the depth and determining the occlusion as the number of pixels having respective differences between the light reflectivity and the depth of the pixel of the first sensor data and the light reflectivity and the depth of the corresponding pixel of the virtual maps exceeding respective light reflectivity and depth thresholds.

The method can further include actuating a fluid sprayer to spray cleaning fluid onto the time-of-flight sensor when the occlusion exceeds the occlusion threshold.

The method can further include identifying a type of obstruction of the time-of-flight sensor based on the occlusion.

The method can further include actuating a light source to emit a plurality of light pulses and to collect the first sensor data and the second sensor data during emission of the light pulses.

The method can further include determining the depth for each pixel of the first sensor data and the depth for each pixel of the second sensor data based on a time delay of receipt of illumination for each pixel after emission of the light pulses.

The method can further include determining the light reflectivity for each pixel of the first sensor data and the light reflectivity for each pixel of the second sensor data based on a respective illumination of each pixel after emission of the light pulses.

The method can further include masking a plurality of pixels of the virtual map, each masked pixel being a pixel of the first sensor data having a respective light reflectivity or depth exceeding a light reflectivity threshold or a depth threshold and the corresponding pixel of the second sensor data having a respective light reflectivity or depth below a second light reflectivity threshold or a second depth threshold.

The method can further include determining the occlusion of the masked pixels and actuating the component when the occlusion exceeds the occlusion threshold.

The method can further include identifying the masked pixels as pixels of the second sensor data for which light reflectivity or depth data were not collected.

The method can further include determining an ambient illumination and determining the light reflectivity for each pixel of the first sensor data and each pixel of the second sensor data based on a difference between the ambient illumination and an amplitude of a light pulse received by each pixel.

A system includes a time-of-flight sensor, an image sensor, means for collecting first image data from the time-of-flight sensor, means for collecting second image data from the image sensor, means for generating a virtual map of at least one of a light reflectivity or a depth from the time-of-flight sensor from the collected first image data and the collected second image data, means for determining a difference between the light reflectivity or the depth of each pixel of the first image data from the light reflectivity or the depth of each corresponding pixel of the virtual map, means for determining an occlusion of the time-of-flight sensor as a number of pixels having respective differences of the light reflectivity or the depth exceeding an occlusion threshold, and means for actuating a component to clean the time-of-flight sensor when the occlusion exceeds an occlusion threshold.

The system can further include means for generating a second virtual map of the other of the light reflectivity and the depth and means for determining the occlusion as the number of pixels having respective differences between the light reflectivity and the depth of the pixel of the first image data and the light reflectivity and the depth of the corresponding pixel of the virtual maps exceeding respective light reflectivity and depth threshold.

The system can further include means for emitting a plurality of light pulses and means for collecting the first image data and the second image data during emission of the light pulses.

The system can further include means for masking a plurality of pixels of the virtual map, each masked pixel being a pixel of the first image data having a respective light reflectivity or depth exceeding a light reflectivity threshold or a depth threshold and the corresponding pixel of the second image data having a respective light reflectivity or depth below a second light reflectivity threshold or a second depth threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Developing virtual reflectivity and depth maps from sensor data collected from a time-of-flight sensor and another sensor detects debris on the time-of-flight sensor and allows a vehicle computer to mitigate the debris on the time-of-flight sensor. Fusing the data from the time-of-flight sensor and another sensor, e.g., an image sensor, can differentiate between different types of occluding debris resulting in different types of depth map degradation and that can require different cleaning techniques to remove from the time-of-flight sensor. Based on the detected debris, the computer can actuate a cleaning component to remove the specific debris from the time-of-flight sensor or alter computation of the image, e.g. sensor fusion algorithm modification.

Figure 1:
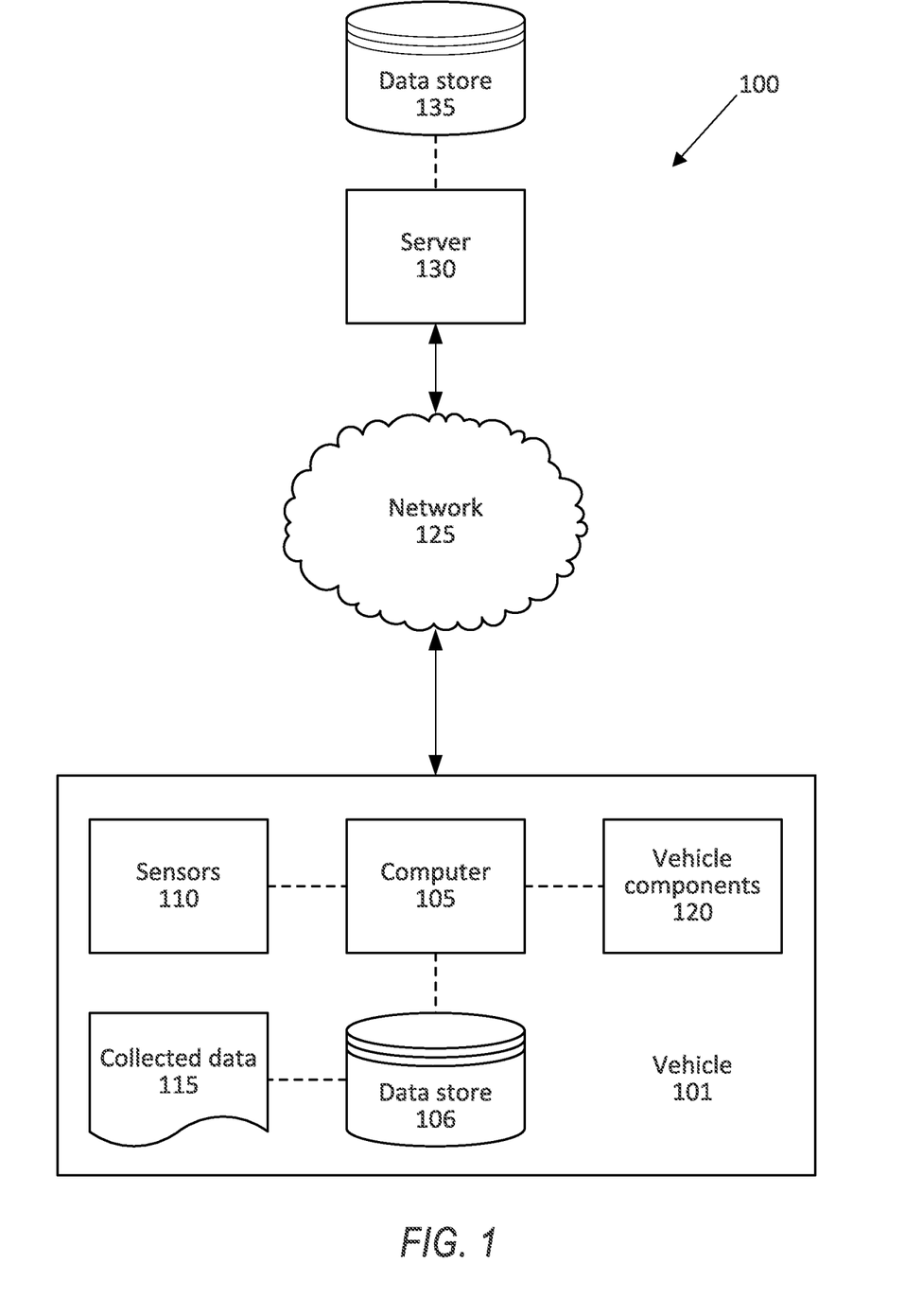
FIG. 1 is a diagram of an example system for performing a sensor diagnostic.

FIG. 1 illustrates an example system 100 for performing a sensor diagnostic. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a cleaning component, a park assist component, an adaptive cruise control component, an adaptive steering component, a movable seat, or the like.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
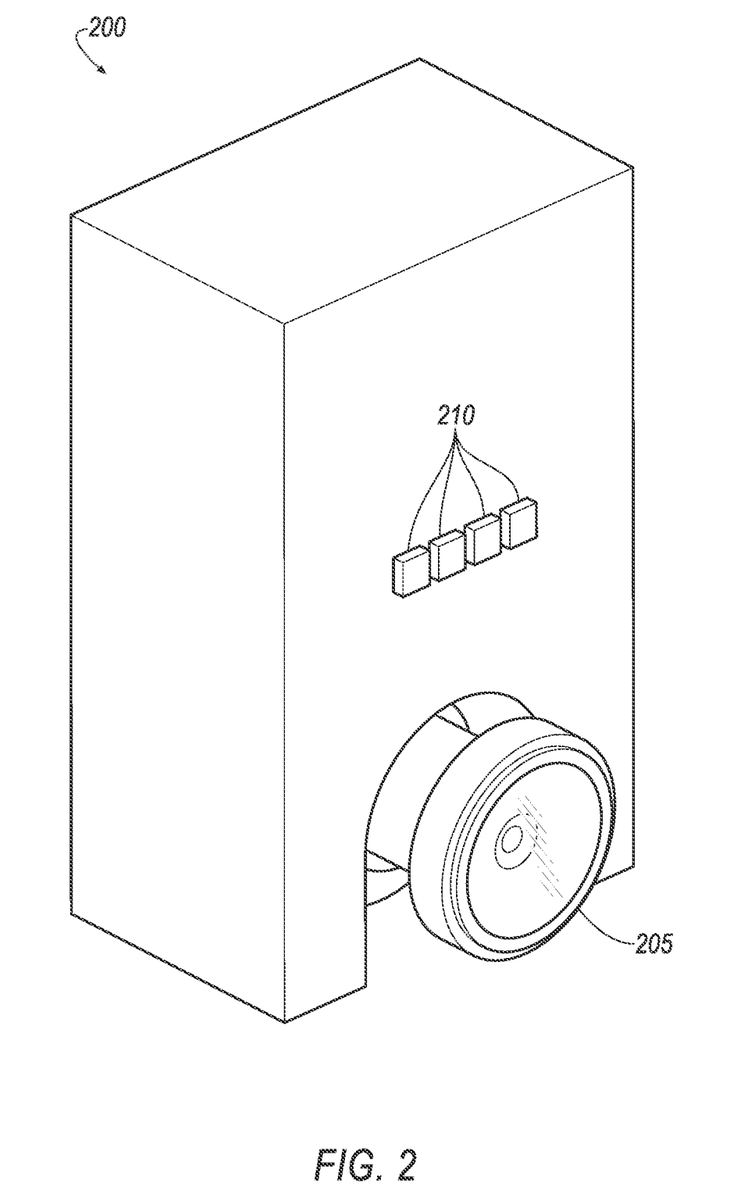
FIG. 2 is a perspective view of an example time-of-flight sensor.

FIG. 2 is a perspective view of an example time-of-flight sensor 200. The time-of-flight sensor 200 includes a camera 205 and a light source 210. In the example of FIG. 2, the light source 210 is a plurality of light emitters. Alternatively, the light source 210 can be a single light emitter. The light source 210 generates a plurality of light pulses that can be reflected from objects in a field of view of the camera 205. The computer 105 can use a conventional pulsed light technique to develop the depth maps. That is, the camera 205 receives the reflected light pulses and the computer 105 can predict a distance between the camera 205 and the object off of which the light reflected based on electric charges received by two out-of-phase windows of the camera 205, the time difference between emission of the light pulses and receipt of the light pulses, and the speed of light, as shown in Equation 1:

$$d = \frac{1}{2} c \Delta t \left( \frac{Q_2}{Q_1 + Q_2} \right) \quad (1)$$

where d is the depth of a pixel, c is the speed of light, $\Delta t$ is a time difference between emission and receipt of the light pulse, $Q_1$ is an electric charge of a first photon received by the camera 205 at the pixel, and $Q_2$ is the electric charge of a second photon received by the camera 205 at the pixel. Alternatively, the computer 105 can use a conventional modulated signal correlation function that determines the depth based on a phase between an emitted light pulse and a received light pulse. Yet alternatively, the computer 105 can use a direct time of flight technique that predicts the distance between the camera 205 and the object based on a time difference between emission of the light pulse and receipt of the light pulse multiplied by the speed of light. The camera 205 can, upon receipt of the light pulse, determine an amplitude of the light received by the camera 205.

Figure 3:
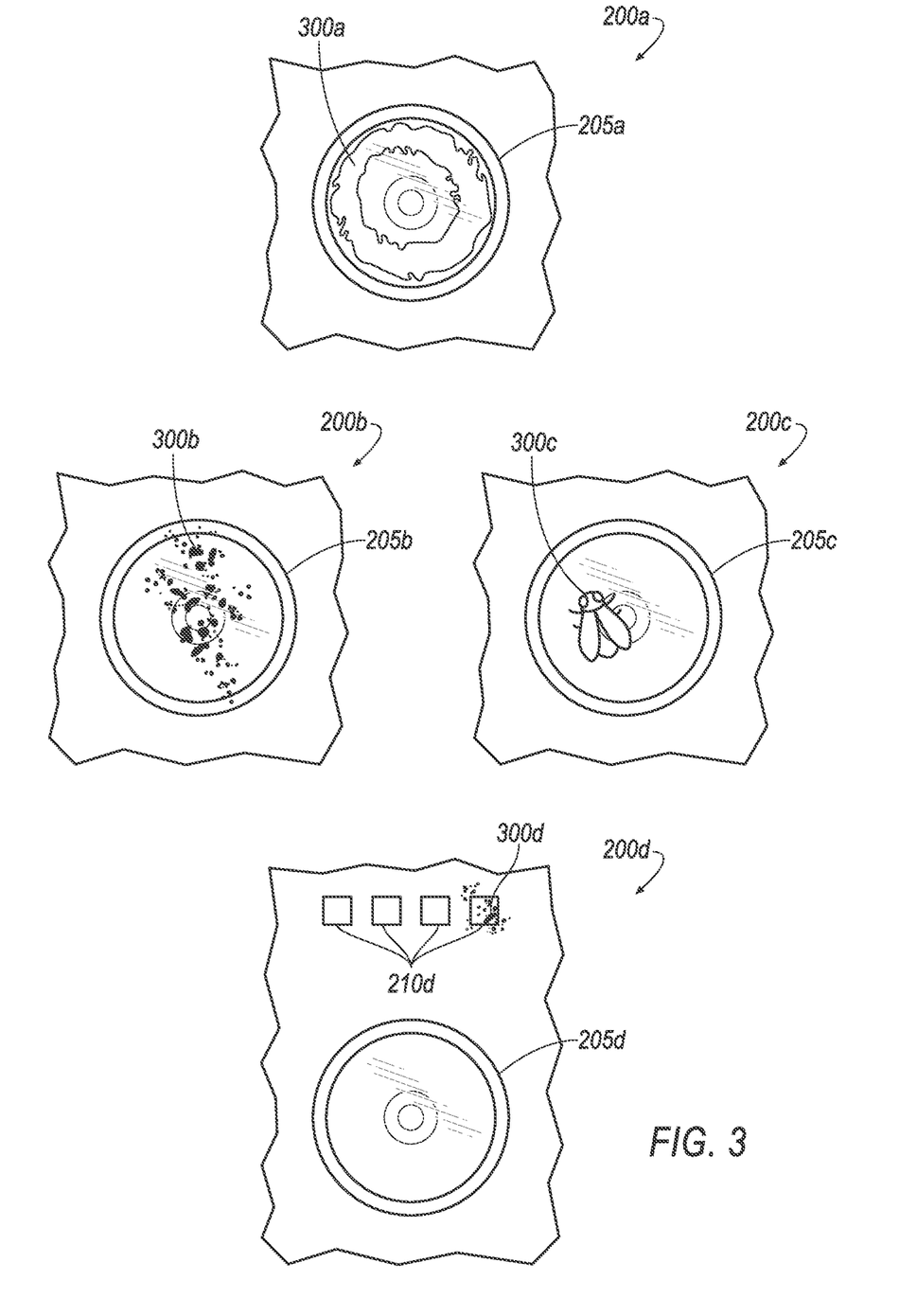
FIG. 3 is a view of example sensors that have debris.

FIG. 3 shows a plurality of example time-of-flight sensors 200 with occluding debris 300. The occluding debris 300 prevents light from the light source 210 from reaching the camera 205, reducing the amount of data 115 collected by the time-of-flight sensor 200. In the example of FIG. 3, four sensors 200a, 200b, 200c, 200d are shown each having different kinds of occluding debris 300a, 300b, 300c, 300d. The sensor 200a has debris 300a that is dirty water, i.e., water collected on the camera 205a of the sensor 200a that has occluding particles such as dirt or dust suspended therein. The sensor 200b has debris 300b that is dry dust, i.e., occluding particles such as dirt or dust that cover a portion of the camera 205b but do not include water. The sensor 200c has debris 300c that is a creature, e.g., an insect, an arthropod, an arachnid, etc. That is, small creatures can fly and/or crawl onto the camera 205c, occluding the sensor 200. The computer 105 an actuate the cleaning component 120 to spray fluid onto the creature, signaling the creature to move away from the sensor 200c. The sensor 200d has debris 300d that is dry dust on the light source 210d, reducing the amount of light emitted by the light source 210d and received by the camera 205d. That is, the camera 205 and the light source 210 of a time-of-flight sensor 200 can each be occluded with dry dust, and the computer 105 can actuate the cleaning component 120 to remove the dry dust from either or both of the camera 205 and the light source 210. The occluding debris can reduce or block light pulses from reflected objects, delaying or stopping the light pulses from reaching the camera 205, resulting in inaccurate reflectivity and depth maps that may not detect objects near the vehicle 101.

Figure 4:
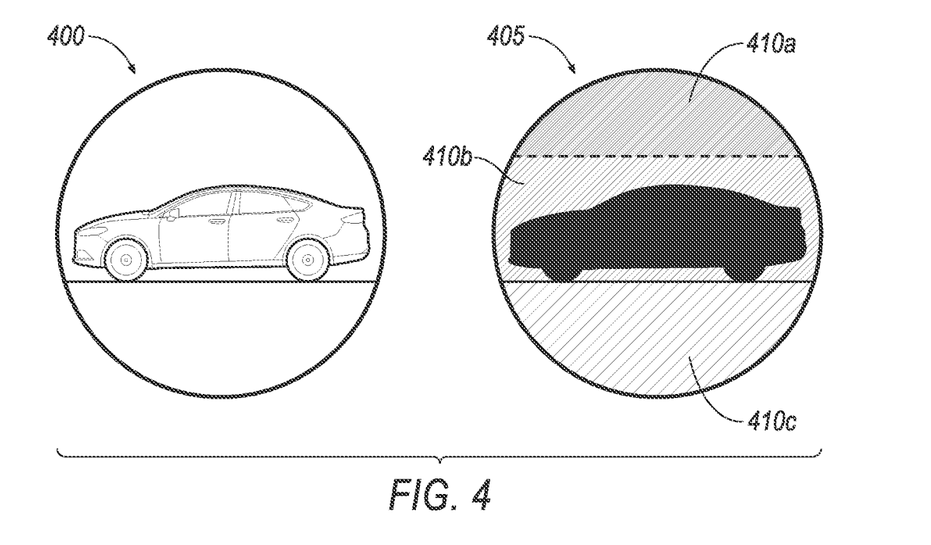
FIG. 4 is a view of an example reflectivity map and an example depth map of a sensor without debris.
Figure 5:
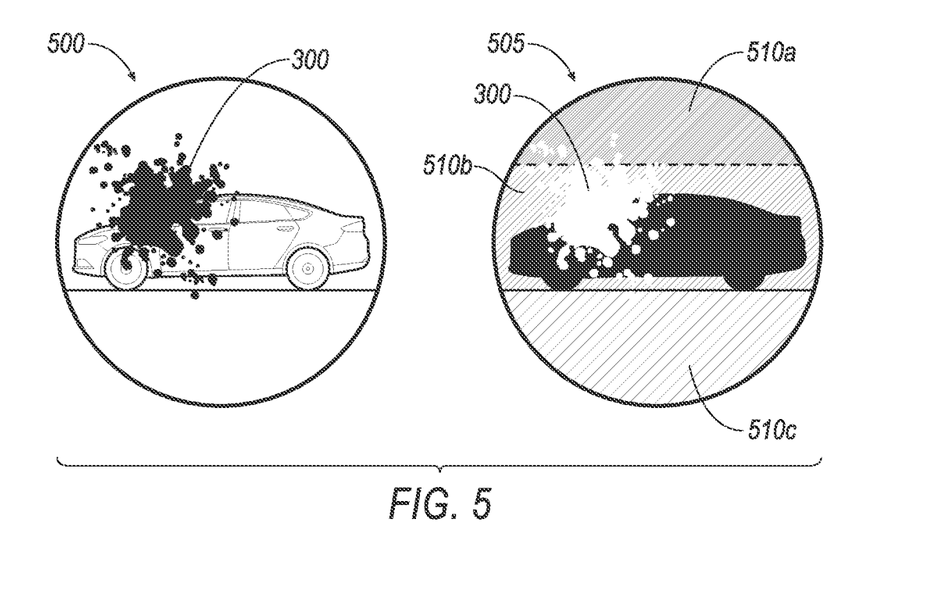
FIG. 5 is a view of an example reflectivity map and an example depth map of a sensor with debris.

FIG. 4 shows an example reflectivity map 400 and an example depth map 405 based on data 115 collected from a time-of-flight sensor 200 having no occluding debris 300. FIG. 5 shows an example reflectivity map 500 and an example depth map 505 based on data collected from a time-of-flight sensor 200 having occluding debris 300. In the present context, a "reflectivity map" is a map of an amount of light reflected from objects viewed by the camera 205, i.e., an amplitude of light received by the camera 205. In this context, a "depth map" is a map of a distance between the camera 205 and the objects viewed by the camera 205. A depth map 405, 505 can include gradations 410, 510 that indicate a range of depths from the camera 205. For example, a depth map 405 can include gradations 410a, 410b, 410c, wherein each pixel of the depth map 405 within a particular gradation 410 is within a distance range of the camera 205, e.g., pixels of the depth map 405, 505 in the gradation 410a, 510a can be greater than 5 meters from the camera 205, pixels in the gradation 410b, 510b can be more than 3 meters but less than 5 meters from the camera 205, and pixels in the gradation 410c, 510c can be less than 3 meters from the camera 205. The gradations 410, 510 can be represented in the depth map 405, 505 by different colors or, as shown in FIGS. 4-5, hatching representing a color gradient. That is, the hatching of the gradation 410a, 510a can represent a dark gray, the gradation 410b, 410b can represent a medium gray, and the gradation 410c, 510c can represent a light gray. Debris 300 on the maps 500, 505 occludes the reflectivity and the depth of objects viewed by the time-of-flight sensor 200. For example, in the map 500, the debris 300 prevents light from reaching the camera 205, resulting in dark portions of the resulting image that occlude the shape of the object in the image. In another example, in the map 505, the debris 300 is directly on the camera 205, so the depth measured is 0 and is represented as white portions in the example of FIG. 5. The debris 300 can introduce noise to the image, reducing clarity of the object in the image. For example, in the map 405, an object (e.g., a vehicle 101) can be clearly delineated while a surrounding environment can have ambient noise. In the map 505, the debris 300 can introduce noise onto a portion of the image where the object would typically be viewed, blurring the boundary of the object.

To generate a reflectivity map 400, 500 and a depth map 405, 505, the computer 105 instructs the time-of-flight sensor 200 and one or more other sensors 110 to collect data 115 around the vehicle 101. For example, as shown in FIGS. 4-5, the time-of-flight sensor 200 and an image sensor 110 can collect image data 115 of a target vehicle 101 near the vehicle 101. The image sensor 110 can be, e.g., a complementary metal-oxide-semiconductor (CMOS) camera, a charged-coupled device (CCD) camera, etc. In another example, the additional sensors 110 can include, e.g., lidar, radar, infrared emitters, ultrasonic transducers, etc. Using multiple sensors 110, 200 allows the computer 105 to fuse data 115 from more than one source to generate more accurate maps 400, 405, 500, 505.

The computer 105 can determine ambient illumination around the vehicle 101. An image sensor 110 and/or an illumination sensor can receive waves of light from sources other than the light source (e.g., the sun, a street light, a building light, etc.), and the "ambient illumination" is the amplitude of the light received by the image sensor 110 and/or the illumination sensor. The computer 105 can, based on the data 115 from the image sensor 110 and/or an illumination sensor, determine an illumination of the environment around the vehicle 101. The image data 115 from the time-of-flight sensor 200 and the image sensor 110 includes a measured amplitude of light waves received using conventional light-detection techniques, and the computer 105 can, based on the ambient illumination, determine whether the amplitudes in the image data 115 are the result of ambient illumination or light from the light source 210. For example, if the amplitude of light received in a specific pixel is greater than a previously determined amplitude that was determined to be ambient illumination, the computer 105 can determine that the difference between the current amplitude and the amplitude of the ambient illumination is light from the light source 210. Thus, the computer 105 can generate the reflectivity map 400, 500 and the depth map 405, 505 based on light from the light source 210. In another example, the debris 300 can reduce an amount of light received by the time-of-flight sensor 200, and the computer 105 can compare the reflectivity map 400, 500 to the ambient illumination to identify occlusion of the time-of-flight sensor 200, e.g., by identifying that the reflectivity map 400, 500 has lower amplitudes of light than the ambient illumination by an illumination threshold determined by empirical testing of specific amounts of debris 300 on time-of-flight sensors 200. Alternatively, the computer 105 can generate the reflectivity map 400, 500 and the depth map 405, 505 without determining the ambient illumination, i.e., using the amplitude of the light by the image sensor 110.

The computer 105 can localize the data 115 in a vehicle coordinate system, i.e., specify coordinates of objects indicated by the data 115 in the vehicle coordinate system. The vehicle coordinate system can be a conventional Cartesian coordinate system centered at an origin (e.g., a front center point of a bumper) having a first axis extending in a vehicle-forward longitudinal direction and a second axis extending in a vehicle-crosswise lateral direction, the second axis being perpendicular to the first axis. The data 115 from the time-of-flight sensor 200 and the image sensor 110 can be collected in a sensor coordinate system, i.e., a conventional Cartesian coordinate system having an origin at the respective sensor 110, 200. The computer 105, using conventional coordinate transformation techniques, can transform spatial coordinates of the data 115 in respective sensor coordinate systems to the vehicle coordinate system. By localizing the data 115 in the vehicle coordinate system, the computer 105 can fuse the data 115, i.e., convert the data 115 from the two sensors 110, 200 into a same coordinate system, from the time-of-flight sensor 200 and the image sensor 110 to generate the reflectivity map, 400, 500 and the depth map 405, 505.

The computer 105 can generate a reflectivity map 400, 500 based on the fused data 115. As described above, the reflectivity map 400, 500 is a virtual map light reflected from surfaces of objects captured by the time-of-flight sensor 200 and the image sensor 110. The data 115 from the image sensor 110 and the time-of-flight sensor 200 includes, for each pixel, an amplitude of light received by each pixel. The computer 105 determines the "reflectivity" of each pixel of the reflectivity map as the amplitude of light received at each pixel measured by the fused data 115 from the time-of-flight sensor 200 and the image sensor 110.

The computer 105 can generate a depth map 405, 505 based on the fused data 115. As described above, a depth map 405, 505 is a virtual (i.e., stored in a computer memory and typically not displayed or rendered physically) map of a distance between the time-of-flight sensor 200 to the surface of the object off of which the received light reflected. That is, the "depth" of each pixel of the fused data 115 is the distance between the surface of the object captured by that pixel and the time-of-flight sensor 200. The computer 105 can determine the depth map 405, 505 based on a conventional pulsed light technique as described above. Alternatively or additionally, the computer 105 can use a direct time of flight technique that predicts the distance between the camera 205 and the object based on a time difference between emission of the light pulse and receipt of the light pulse multiplied by the speed of light. That is, based on the speed of light, a timestamp indicating emission of light from the light source 210, and a timestamp indicating receipt of light for each pixel of the image sensor 110 and the time-of-flight sensor 200, the computer 105 can determine a distance between each pixel of the respective sensor 110, 200 and the object captured by the respective pixel.

The computer 105 can generate a predicted reflectivity map and a predicted depth map based on the fused data 115. The predicted reflectivity map and the predicted depth map are maps of the reflectivity and the depth that the time-of-flight sensor 200 is predicted to detect without debris based on the fused data 115. That is, the computer 105 can predict the received reflectivity to the time-of-flight sensor 200 and the received depth measurements to the time-of-flight sensor 200 with a conventional image-processing technique. For example, the computer 105 can apply a conventional ray-tracing technique to the fused data 115, i.e., simulating a light from a light source and, for each pixel of the fused data 115, predicting the amplitude and phase delay of the simulated light from the object detected in the pixel. Based on the predicted amplitude and phase delay, the computer 105 can predict a reflectivity and a depth from the object for the pixel. Upon applying the ray-tracing technique for each pixel of the fused data 115, the computer 105 can collect the predicted reflectivity and depth into respective maps, i.e., a predicted reflectivity map and a predicted depth map. In another example, the computer 105 can develop a three-dimensional cross section of the object detected by sensors 110 other than the time-of-flight sensor 200, e.g., with radar and/or lidar, and can interpolate a surface connecting the data 115 from the sensors 110 to generate the predicted depth map. In yet another example, the computer 105 can use a conventional high dynamic range mapping algorithm to predict a radiant flux leaving a pixel and a ray tracing algorithm, as described above, to predict a radiant flux received by the pixel, the predicted reflectivity map being the ratio of the flux leaving divided by the flux received for each pixel.

The computer 105 can determine a light reflectivity difference between the reflectivity map 400, 500 and the predicted reflectivity map. The light reflectivity difference is a measure of the reflected light that the time-of-flight sensor 200 does not receive because of occlusion from debris 300. That is, the predicted reflectivity map indicates the reflectivity that the time-of-flight sensor 200 should receive, and the light reflectivity difference indicates pixels that can be occluded by debris 300 on the time-of-flight sensor 200.

The computer 105 can determine a depth difference between the depth map 405, 505 and the predicted depth map. The depth difference is a measure of the depth not detected by the time-of-flight sensor 200 because of occlusion from debris 300. That is, the predicted depth map indicates the depth that the time-of-flight sensor 200 should detect, and the depth difference indicates pixels that can be occluded by debris 300 on the time-of-flight sensor 200.

The computer 105 can mask pixels of objects visible only to the time-of-flight sensor 200. In this context, to "mask" pixels, the computer 105 performs a pixel wise filtering operation to hide pixels from use in calculations to determine the reflectivity difference and the depth difference. Example calculations include, e.g., such as object detection, sensor fusion, etc. The field of view of the time-of-flight sensor 200 can differ from the field of view of the image sensor 110. For example, the time-of-flight sensor 200 can have a greater field of view and/or can include more pixels than the image sensor 110 and can view objects that the image sensor 110 cannot view. The computer 105 can identify pixels of the time-of-flight sensor 200 that do not have corresponding pixels of the image sensor 110 and can mask the identified pixels. That is, the computer 105 can generate a reference map with values of 0 for pixels identified to be masked which can be multiplied to the data 115 so the computer 105 does not develop the reflectivity or depth for the masked pixels.

The computer 105 can determine an occlusion of the time-of-flight sensor 200 based on the reflectivity map 400, 500, the depth map 405, 505, the predicted reflectivity map, and the predicted depth map. The computer 105 can compare each pixel of the reflectivity map 400, 500 to a corresponding pixel of the predicted reflectivity map. If the pixel of the reflectivity map 400, 500 has a reflectivity below a reflectivity threshold and the corresponding pixel of the predicted reflectivity map is above the reflectivity threshold, the computer 105 can determine that the pixel is occluded. This occlusion may result in greater error or bias in estimating the depth of that corresponding pixel location. Similarly, an occlusion located on a part of the light source 210 may occlude part of the image and increase the depth error estimate due to a lower signal to noise ratio relative to the ambient lighting of the environment.

The reflectivity threshold can be determined based on a data 115 collection limit of the time-of-flight sensor 200, e.g., pixels having a reflectivity below the reflectivity threshold return a null value (e.g., NaN) for the reflectivity, and pixels having a reflectivity above the reflectivity threshold return a non-null value. That is, if the pixel in the reflectivity map 400, 500 returns a null value and the predicted reflectivity map does not return a null value for the corresponding pixel, the computer 105 can determine that the pixel in the reflectivity map 400, 500 is occluded by debris. An additional set of morphological operations, e.g., erosion and dilation may be performed to remove single pixel false positives and only detect clusters of pixels believed to be occluded. If corresponding pixels of both the reflectivity map 400, 500 and the predicted reflectivity map return null values, the computer 105 can determine that the pixels are outside a field of view of the time-of-flight sensor 200. Alternatively or additionally, the computer 105 can determine an occlusion of the time-of-flight sensor 200 when a pixel of the depth map 405, 505 returns a null value and the corresponding pixels of the predicted depth map 405, 505 does not return a null value. Yet further alternatively, the computer 105 can identify a pixel as occluded when the reflectivity difference of the pixel exceeds a reflectivity difference threshold determined based on a light receipt resolution of the time-of-flight sensor 200 and/or the image sensor 110 or the depth difference of the pixel exceeds a depth difference threshold determined based on a distance resolution of the time-of-flight sensor 200 and/or the image sensor 110. Alternatively or additionally, the computer 105 can determine the reflectivity threshold and the depth difference threshold based on, e.g., diffuse and specular reflectivity of surfaces, wavelength differences between emitted light pulses and received light pulses, noise in data 115 collection by the time-of-flight sensor 205 and/or other sensors 110, temporal changes in successive images, etc. For example, empirical testing of images collected by time-of-flight sensors 200 with specific amounts of debris 300 can result in reference data for amounts of debris 300 and parameters such as, e.g., diffuse and specular reflectivity of surfaces, wavelength differences between emitted light pulses and received light pulses, noise in data 115 collection by the time-of-flight sensor 200 and/or other sensors 110, temporal changes in successive images, etc., and the thresholds can be determined based on the reference data and correlations determined therefrom.

The computer 105 can determine the occlusion of the time-of-flight sensor 200 based on a number of pixels of the reflectivity map 400, 500 and/or the depth map 405, 505 that have a reflectivity below a reflectivity threshold or a depth below a depth threshold. For example, the computer 105 can identify the number of pixels of the reflectivity map 400, 500 that have values below the reflectivity threshold and for which corresponding pixels of the predicted reflectivity map are above the reflectivity map. The computer 105 can divide the number of identified pixels by the total number of pixels in the reflectivity map 400, 500 to determine a ratio of identified pixels to total pixels. Based on the ratio, the computer 105 can determine the amount and type of obstruction of the time-of-flight sensor 200. The type of obstruction can be, e.g., light debris, heavy debris, clean water, debris in water, debris on a light source 210, etc. For example, the computer 105 can include a lookup table such as Table 1 listing the type of occlusion based on the ratio of identified pixels to the total pixels:

TABLE 1

| Ratio | Occlusion |
| --- | --- |
| 0.13% | Clean |
| 0.17% | Water and dirt on camera |
| 0.20% | Heavy dirt on camera |
| 0.70% | Debris on all light sources |

The computer 105 can actuate a cleaning component 120 to clean the time-of-flight sensor 200 upon identifying the type and amount of obstruction causing the occlusion. For example, if the occlusion is heavy dirt on the camera 205, the computer 105 can actuate an air nozzle to blow air onto the camera 205 to remove the dirt. In another example, if the occlusion is water and dirt on the camera, the computer 105 can actuate a fluid nozzle to spray cleaning fluid onto the camera 205. In yet another example, if the occlusion is debris on the light sources 210, the computer 105 can actuate the air nozzle to blow air onto the light sources 210 to remove the debris.

The computer 105 can, upon identifying the occlusion, adjust a vehicle 101 motion algorithm. When the time-of-flight sensor 200 is occluded, the data 115 received by the time-of-flight sensor 200 may be less accurate than data 115 from a clean time-of-flight sensor 200. The computer 105 can adjust operation of a vehicle 101 propulsion, steering, and/or brake to account for the occluded data 115. For example, the computer 105 can operate the propulsion at a lower speed until the cleaning component 120 removes the debris from the time-of-flight sensor 200. In another example, the computer 105 can increase a distance between the vehicle 101 and another vehicle 101 in the roadway.

Figure 6:
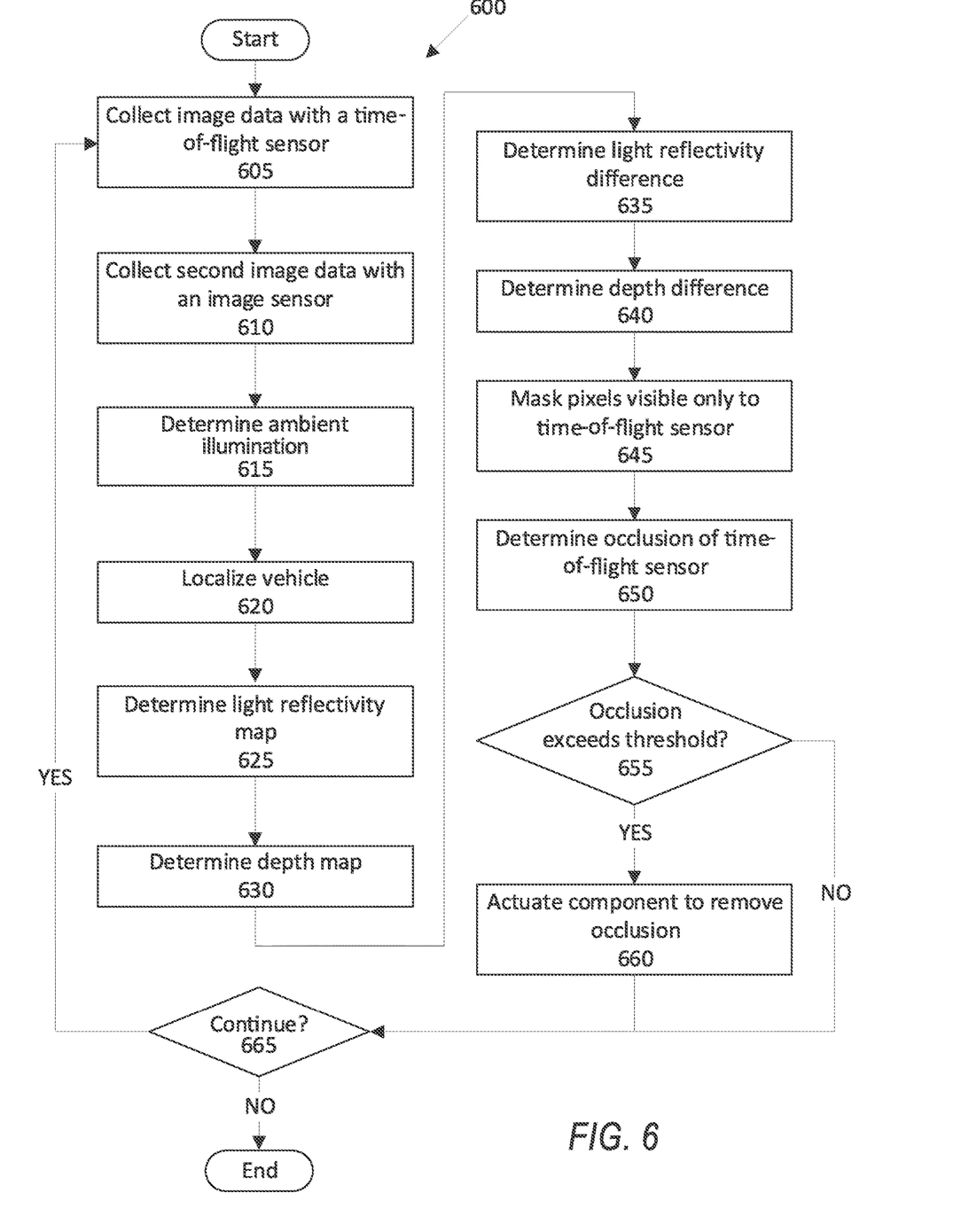
FIG. 6 is a diagram of an example process for performing the sensor diagnostic.

FIG. 6 is a diagram of an example process 600 for performing a sensor diagnostic. The process 600 begins in a block 605, in which a computer 105 actuates a time-of-flight sensor 200 to collect image data 115 around a vehicle 101. The computer 105 actuates a light source 210 of the time-of-flight sensor 200 and the camera 205 receives light reflected from objects around the vehicle 101, generating image data 115.

Next, in a block 610, the computer 105 actuates an image sensor 110 to collect second image data 115 around the vehicle 101. The image sensor 110 collects image data 115 of the same object that the time-of-flight sensor 200 collects. The image sensor 110 can be, e.g., a CMOS camera, a CCD camera, etc.

Next, in a block 615, the computer 105 determines an ambient illumination. The computer 105 can, based on the data 115 from the image sensor 110 and/or an illumination sensor, determine an illumination of the environment around the vehicle 101. The image data 115 from the time-of-flight sensor 200 and the image sensor 110 includes an amplitude of light received, and the computer 105 can, based on the ambient illumination, determine whether the amplitudes in the image data 115 are the result of ambient illumination or light from the light source 210. Alternatively, the computer 105 can proceed from the block 610 to a block 620 without determining the ambient illumination. The computer 105 can determine to skip the block 615 and generate the reflectivity map 400, 500 and the depth map 405, 505 without determining the ambient illumination to reduce power consumption by the computer 105 and/or to more quickly generate the maps 400, 405, 500, 505.

In the block 620, the computer 105 localizes the image data 115 and the second image data 115 from the vehicle 101 in a vehicle coordinate system. As described above, the data 115 from the time-of-flight sensor 200 and the image sensor 110 can be collected in a sensor coordinate system, i.e., a conventional Cartesian coordinate system having an origin at the respective sensor 110, 200. The computer 105, using conventional coordinate transformation techniques, can transform spatial coordinates of the data 115 in respective sensor coordinate systems to the vehicle coordinate system. By localizing the data 115 in the vehicle coordinate system, the computer 105 can fuse the data 115 from the time-of-flight sensor 200 and the image sensor 110 to generate the reflectivity map, 400, 500 and the depth map 405, 505.

Next, in a block 625, the computer 105 determines a light reflectivity map 400, 500 based on the fused data 115. As described above, the light reflectivity map 400, 500 is a virtual map of an amount of light reflected from objects viewed by the camera 205, i.e., an amplitude of light received by the camera 205. The data 115 from the image sensor 110 and the time-of-flight sensor 200 includes, for each pixel, an amplitude of light received by each pixel. The computer 105 determines the reflectivity of each pixel of the reflectivity map as the amplitude of light received at each pixel measured by the fused data 115 from the time-of-flight sensor 200 and the image sensor 110.

Next, in a block 630, the computer 105 determines a depth map 405, 505 based on the fused data 115. As described above, the computer 105 can determine the depth map 405, 505 with a conventional pulsed light technique that uses electric charges received by two out-of-phase windows of the camera 205, the time difference between emission of the light pulses and receipt of the light pulses, and the speed of light, as described above. Alternatively, the computer 105 can determine the depth map 405, 505 based on a time delay between emission of light from the light source 210 and receipt of the light by the image sensor 110 and the time-of-flight sensor 200. That is, based on the speed of light, a timestamp indicating emission of light from the light source 210, and a timestamp indicating receipt of light for each pixel of the image sensor 110 and the time-of-flight sensor 200, the computer 105 can determine a distance between each pixel of the respective sensor 110, 200 and the object captured by the respective pixel.

Next, in a block 635, the computer 105 determines a reflectivity difference between the light reflectivity map 400, 500 and a predicted light reflectivity map. The reflectivity difference is a measure of the reflected light that the time-of-flight sensor 200 does not receive because of occlusion from debris 300. That is, the predicted reflectivity map indicates the reflectivity that the time-of-flight sensor 200 should receive, and the light reflectivity difference indicates pixels that can be occluded by debris 300 on the time-of-flight sensor 200.

Next, in a block 640, the computer 105 determines a depth difference between the depth map 405, 505 and a predicted depth map. The depth difference is a measure of the depth not detected by the time-of-flight sensor 200 because of occlusion from debris 300. That is, the predicted depth map indicates the depth that the time-of-flight sensor 200 should detect, and the depth difference indicates pixels that can be occluded by debris 300 on the time-of-flight sensor 200.

Next, in a block 645, the computer 105 masks pixels of the reflectivity map 400, 500 and/or the depth map 405, 505 that are visible only to the time-of-flight sensor 200. That is, as described above, the field of view of the time-of-flight sensor 200 can differ from the field of view of the image sensor 110. For example, the time-of-flight sensor 200 can have a greater field of view and/or can include more pixels than the image sensor 110 and can view objects that the image sensor 110 cannot view. The computer 105 can identify pixels of the time-of-flight sensor 200 that do not have corresponding pixels of the image sensor 110 and can mask the identified pixels, i.e., hide the pixels from use in calculations such as object detection, sensor fusion, etc., as described above.

Next, in a block 650, the computer 105 determines an occlusion of the time-of-flight sensor 200, i.e., the amount of pixels obscured by debris or another object on the time-of-flight sensor 200. For example, the computer 105 can compare each pixel of the reflectivity map 400, 500 to a corresponding pixel of the predicted reflectivity map. If the pixel of the reflectivity map 400, 500 has a reflectivity below a reflectivity threshold and the corresponding pixel of the predicted reflectivity map is above the reflectivity threshold, the computer 105 can determine that the pixel is occluded. The reflectivity threshold can be determined based on a data 115 collection limit of the time-of-flight sensor 200, e.g., pixels having a reflectivity below the reflectivity threshold return a null value (e.g., NaN) for the reflectivity, and pixels having a reflectivity above the reflectivity threshold return a non-null value. That is, if the pixel in the reflectivity map 400, 500 returns a null value and the predicted reflectivity map does not return a null value for the corresponding pixel, the computer 105 can determine that the pixel in the reflectivity map 400, 500 is occluded by debris.

Next, in a block 655, the computer 105 determines whether the occlusion is above a predetermined threshold. For example, the computer 105 can divide the number of identified pixels by the total number of pixels in the reflectivity map 400, 500 to determine a ratio of identified pixels to total pixels. Based on the ratio, the computer 105 can determine the amount and type of obstruction causing the occlusion of the time-of-flight sensor 200. The threshold can be determined as a specific ratio beyond which the computer 105 determines that the time-of-flight sensor 200 requires cleaning. For example, the threshold can be 0.17%.

In the block 660, the computer 105 actuates a cleaning component 120 to remove the debris 300 causing the occlusion from the time-of-flight sensor 200. As described above, based on the ratio of identified occluded pixels, the computer 105 actuate a specific cleaning component 120 to remove the debris 300. For example, if the ratio indicates that the debris 300 is heavy dirt on the camera 205, the computer 105 can actuate a fluid sprayer to spray cleaning fluid onto the camera. In another example, if the ratio indicates that the debris 300 is dust on the light source 210, the computer 105 can actuate an air nozzle to blow air onto the light source 210.

In the block 665, the computer 105 determines whether to continue the process 600. For example, the computer 105 can determine to continue the process 600 for each time-of-flight sensor 200. If the computer 105 determines to continue, the process 600 returns to the block 605. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Intercal, Visual Basic, Java Script, Perl, Python, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   collect first sensor data from a time-of-flight sensor;
   collect second sensor data from one or more sensors;
   generate a virtual map, wherein the virtual map includes (a) at least one of a light reflectivity or a depth from the time-of-flight sensor from the collected first sensor data, and (b) the collected second sensor data;
   determine differences between the first sensor data and the virtual map by determining a difference between (a) the light reflectivity or the depth of each pixel of the first sensor data and (b) the light reflectivity or the depth of each corresponding pixel of the virtual map;
   determine an occlusion of the time-of-flight sensor as a number of pixels having respective differences of the light reflectivity or the depth exceeding an occlusion threshold; and
   actuate a component to clean the time-of-flight sensor when the occlusion exceeds an occlusion threshold.

2. The system of claim 1, wherein the instructions further include instructions to generate a second virtual map of the other of the light reflectivity and the depth and to determine the occlusion as the number of pixels having respective differences between the light reflectivity and the depth of the pixel of the first sensor data and the light reflectivity and the depth of the corresponding pixel of the virtual maps exceeding respective light reflectivity and depth thresholds.

3. The system of claim 1, wherein the instructions further include instructions to actuate a fluid sprayer to spray cleaning fluid onto the time-of-flight sensor when the occlusion exceeds the occlusion threshold.

4. The system of claim 1, wherein the instructions further include instructions to identify a type of obstruction of the time-of-flight sensor based on the occlusion.

5. The system of claim 4, wherein the type of obstruction is one of light debris, heavy debris, clean water, debris in water, or debris on a light source.

6. The system of claim 1, wherein the instructions further include instructions to actuate a light source to emit a plurality of light pulses and to collect the first sensor data and the second sensor data during emission of the light pulses.

7. The system of claim 6, wherein the instructions further include instructions to determine the depth for each pixel of the first sensor data and the depth for each pixel of the second sensor data based on a time delay of receipt of illumination for each pixel after emission of the light pulses.

8. The system of claim 6, wherein the instructions further include instructions to determine the light reflectivity for each pixel of the first sensor data and the light reflectivity for each pixel of the second sensor data based on a respective illumination of each pixel after emission of the light pulses.

9. The system of claim 1, wherein the instructions further include instructions to mask a plurality of pixels of the virtual map, each masked pixel being a pixel of the first sensor data having a respective light reflectivity or depth exceeding a light reflectivity threshold or a depth threshold and the corresponding pixel of the second sensor data having a respective light reflectivity or depth below a second light reflectivity threshold or a second depth threshold.

10. The system of claim 9, wherein the instructions further include instructions to determine the occlusion of the masked pixels and to actuate the component when the occlusion exceeds the occlusion threshold.

11. The system of claim 9, wherein the instructions further include instructions to identify the masked pixels as pixels of the second sensor data for which light reflectivity or depth data were not collected.

12. The system of claim 1, wherein the instructions further include instructions to determine an ambient illumination and to determine the light reflectivity for each pixel of the first sensor data and each pixel of the second sensor data based on a difference between the ambient illumination and an amplitude of a light pulse received by each pixel.

13. A method, comprising:
    collecting first sensor data from a time-of-flight sensor;
    collecting second sensor data from one or more sensors;
    generating a virtual map, wherein the virtual map includes (a) at least one of a light reflectivity or a depth from the time-of-flight sensor from the collected first sensor data, and (b) the collected second sensor data;
    determining differences between the first sensor data and the virtual map by determining a difference between (a) the light reflectivity or the depth of each pixel of the first sensor data and (b) the light reflectivity or the depth of each corresponding pixel of the virtual map;
    determining an occlusion of the time-of-flight sensor as a number of pixels having respective differences of the light reflectivity or the depth exceeding an occlusion threshold; and
    actuating a component to clean the time-of-flight sensor when the occlusion exceeds an occlusion threshold.

14. The method of claim 13, further comprising generating a second virtual map of the other of the light reflectivity and the depth and determining the occlusion as the number of pixels having respective differences between the light reflectivity and the depth of the pixel of the first sensor data and the light reflectivity and the depth of the corresponding pixel of the virtual maps exceeding respective light reflectivity and depth threshold.

15. The method of claim 13, further comprising actuating a light source to emit a plurality of light pulses and collecting the first sensor data and the second sensor data during emission of the light pulses.

16. The method of claim 13, further comprising masking a plurality of pixels of the virtual map, each masked pixel being a pixel of the first sensor data having a respective light reflectivity or depth exceeding a light reflectivity threshold or a depth threshold and the corresponding pixel of the second sensor data having a respective light reflectivity or depth below a second light reflectivity threshold or a second depth threshold.

* * * * *